(12) United States Patent
Nitschke et al.

(10) Patent No.: US 7,421,366 B2
(45) Date of Patent: Sep. 2, 2008

(54) BUS STATION CONNECTION TO A BUS SYSTEM FOR RESTRAINING MEANS AND/OR SENSORS

(75) Inventors: Werner Nitschke, Ditzingen (DE); Klaus-Dieter Meier, Leonberg (DE); Knut Balzer, Beilstein (DE); Ewald Mauritz, Weissach (DE); Heiko Buehring, Oldenburg (DE); Hans Bogenrieder, Ingolstadt (DE); Bernd Pfaffeneder, Lappersdorf (DE); Holger Wulff, Ingolstadt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/473,840

(22) PCT Filed: Mar. 23, 2002

(86) PCT No.: PCT/DE02/01082

§ 371 (c)(1),
(2), (4) Date: Mar. 22, 2004

(87) PCT Pub. No.: WO02/080007

PCT Pub. Date: Oct. 10, 2002

(65) Prior Publication Data

US 2004/0148124 A1    Jul. 29, 2004

(30) Foreign Application Priority Data

Mar. 29, 2001    (DE) ................ 101 15 410

(51) Int. Cl.
G06F 19/00    (2006.01)

(52) U.S. Cl. .................................. 702/122

(58) Field of Classification Search ................. 702/122, 702/57, 60, 79, 125, 126, 193, 117, 118, 702/189, 188; 710/119; 370/257
See application file for complete search history.

(56) References Cited

U.S. PATENT DOCUMENTS

| 5,126,674 | A |   | 6/1992 | Miller et al. ............... 324/309 |
|---|---|---|---|---|
| 5,353,301 | A | * | 10/1994 | Mitzlaff .................... 375/152 |
| 5,812,796 | A | * | 9/1998 | Broedner et al. ............ 710/302 |
| 6,188,314 | B1 | * | 2/2001 | Wallace et al. .............. 340/438 |
| 6,332,327 | B1 | * | 12/2001 | Street et al. ................... 62/127 |
| 6,593,867 | B2 | * | 7/2003 | Nguyen ...................... 341/144 |
| RE38,428 | E | * | 2/2004 | Kelly et al. ................. 710/110 |
| 6,744,820 | B1 | * | 6/2004 | Khairallah et al. .......... 375/257 |
| 6,940,840 | B2 | * | 9/2005 | Ozluturk et al. ............. 370/335 |
| 6,983,009 | B2 | * | 1/2006 | Lomp ........................ 375/149 |

(Continued)

FOREIGN PATENT DOCUMENTS

DE    196 11 944    10/1997

(Continued)

*Primary Examiner*—Edward Raymond
(74) *Attorney, Agent, or Firm*—Kenyon & Kenyon LLP

(57) ABSTRACT

A bus station for connection to a bus system for a restraining device and/or sensor is used for muting a defective bus station or to have automatic error management carried out in the bus station, to enable the bus station to transmit properly again. For this purpose, the transmitting current and/or the power consumption of the bus station is monitored. The transmitting stage is triggered and, if appropriate, isolated from the bus station as a function of this monitoring. In a refinement a backup transmitting stage may be connected as a replacement for the defective transmitting stage.

4 Claims, 1 Drawing Sheet

U.S. PATENT DOCUMENTS

| | | | |
|---|---|---|---|
| 6,985,467 B2 * | 1/2006 | Lomp et al. | 370/335 |
| 7,062,664 B2 * | 6/2006 | Date et al. | 713/320 |
| 7,145,903 B2 * | 12/2006 | Gutierrez | 370/362 |
| 2002/0012401 A1 * | 1/2002 | Karolys et al. | 375/257 |
| 2004/0024495 A1 * | 2/2004 | Sunderland | 700/299 |

FOREIGN PATENT DOCUMENTS

| | | |
|---|---|---|
| DE | 196 16 293 | 10/1997 |
| DE | 196 05 956 | 1/1999 |
| DE | 198 13 123 | 7/1999 |
| DE | 196 22 685 | 6/2003 |
| EP | 0 735 493 | 10/1996 |
| EP | 0 911 223 | 4/1999 |
| WO | 97/32758 | 9/1997 |
| WO | 98/36949 | 8/1998 |
| WO | 99/50106 | 10/1999 |

* cited by examiner

BUS STATION CONNECTION TO A BUS SYSTEM FOR RESTRAINING MEANS AND/OR SENSORS

FIELD OF THE INVENTION

The present invention is directed to a bus station for connection to a bus system for restraining means and/or sensors.

BACKGROUND INFORMATION

It is known that in restraining systems sensors and/or ignition means are connectable to a bus as bus stations and in particular the sensors transmit sensor signals via the bus in data messages.

SUMMARY OF THE INVENTION

The bus station according to the present invention for connection to a bus system for restraining means and/or sensors has the advantage over the related art that, due to the check of the signals from the transmitting stage or the power consumption of the bus station, error management is automatically initiated in the bus station. This check may advantageously take place continuously, which prevents, in particular, a defective bus station from blocking data traffic over the bus.

A sensor and/or a restraining means having an ignition means is understood here as a bus station.

It is particularly advantageous that, if a fault is detected, the logic circuit of the bus station isolates the transmitting stage of the bus station from the bus system, so that the bus station having this transmitting stage is no longer able to transmit data via the bus system. A received bus station, for example, a bus master, thus immediately detects a fault of the transmitting bus station due to the absence of data from this bus station. This makes it possible that a fault in a defective bus station does not affect the data transmission of other bus stations, while the overall bus load is reduced.

It is furthermore advantageous that in the event of a fault in and isolation of the transmitting stage the bus station connects a backup transmitting stage to the bus system via an additional switch. This ensures that, due to the redundancy, the bus system remains operational even in the event of failure of the transmitting stage.

It is furthermore advantageous that the signals from the transmitting stage are compared to a reference, with both the amplitude and its variation over time, which is known in advance, being monitored. Thus the reference, i.e., the setpoint value, is also time-dependent. The monitoring logic circuit is aware of which bits are transmitted at which point in time, since the logic circuit controls the transmitting stage.

It is furthermore advantageous that the bus station according to the present invention is powered via the bus system, and the transmitting stage modulates this power for transmission. Additional power transmission lines are thus advantageously saved. At the same time, Manchester-coded current modulation is advantageously used. Other modulation methods, however, are also possible.

DETAILED DESCRIPTION

Due to the increasing number of restraining means in a vehicle, bus designs suited for connecting these restraining means and corresponding sensors have been developed. Ignition means and sensors are connectable via a bus system using the same hardware by providing a bus master in particular and using the ignition means and sensors as slaves. The slaves are powered via the bus system, which is usually designed as a two-wire system. The data is transmitted from slave to master in that each slave modulates its power consumption in its allotted time windows. Thus, no arbitration takes place.

In order to prevent data transmission from the fault-free slaves to the master from collapsing in the event of fault in the individual slaves, i.e., bus stations, automatic error management is performed according to the present invention in the individual bus stations as soon as a fault is detected in the bus stations. Error management either includes triggering the transmitting stage so that a kind of closed control loop is installed, or, if a predefined threshold value is exceeded, the transmitting stage may even be disconnected from the bus system. In a refinement, a backup transmitting stage is connected in the event of shutdown of the transmitting stage in order to make continued transmission possible, provided the fault was caused by the transmitting stage.

Figure 1:
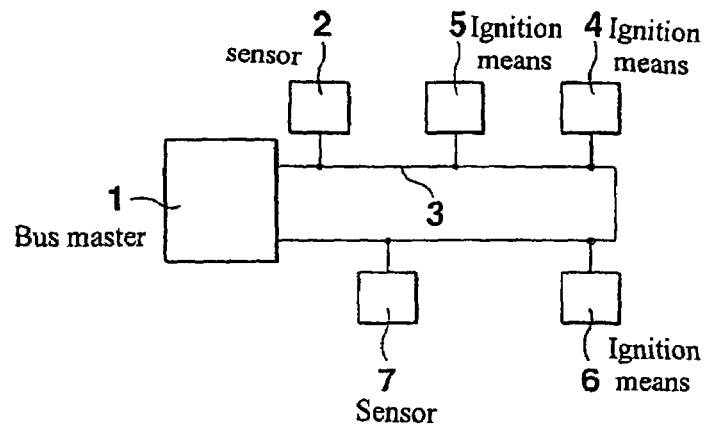
FIG. 1 shows a bus system to which the bus station according to the present invention is connected.

FIG. 1 shows a block diagram of a bus system to which a plurality of bus stations are connected. It is a master-slave bus system, i.e., the slaves (sensors and ignition means) transmit data, sensor values, and diagnostic data to the master, while the master transmits to the slaves requests for data transmission to the master.

A bus master 1 is connected to a bus 3 designed as a ring. Sensors 2 and 7, as well as ignition means 4 through 6 are connected to ring 3. Sensors 2 and 7 are designed according to the present invention. It is, however, also possible that ignition means 4 through 6 are designed according to the present invention, in which case both sensors 2, 7 and ignition means 4 through 6 are bus stations. The sensors are acceleration sensors in this case, which are used for impact detection. It is, however, also possible to use pressure sensors, deformation sensors, and/or temperature sensors for impact detection. Ignition means 4 through 6 are firing pellets, which are ignited to activate a restraining means such as an airbag or a seat belt tightener. Bus master 1 is a control unit here, which computes the deployment algorithm for impact detection as a function of the sensor values and, when appropriate, transmits a deployment command via bus 3 to at least one of ignition means 4 through 6. Furthermore, bus master 1 analyzes the diagnostic data from the individual ignition means 4 through 6 to monitor the operational readiness of individual ignition means 4 through 6. Bus 3 is designed as a dual-wire line in this case. However, a single-wire line may also be used as bus 3. In addition to a ring configuration, other bus configurations such as daisy chain, parallel or mixed forms, as well as spur lines, may also be used.

Figure 2:
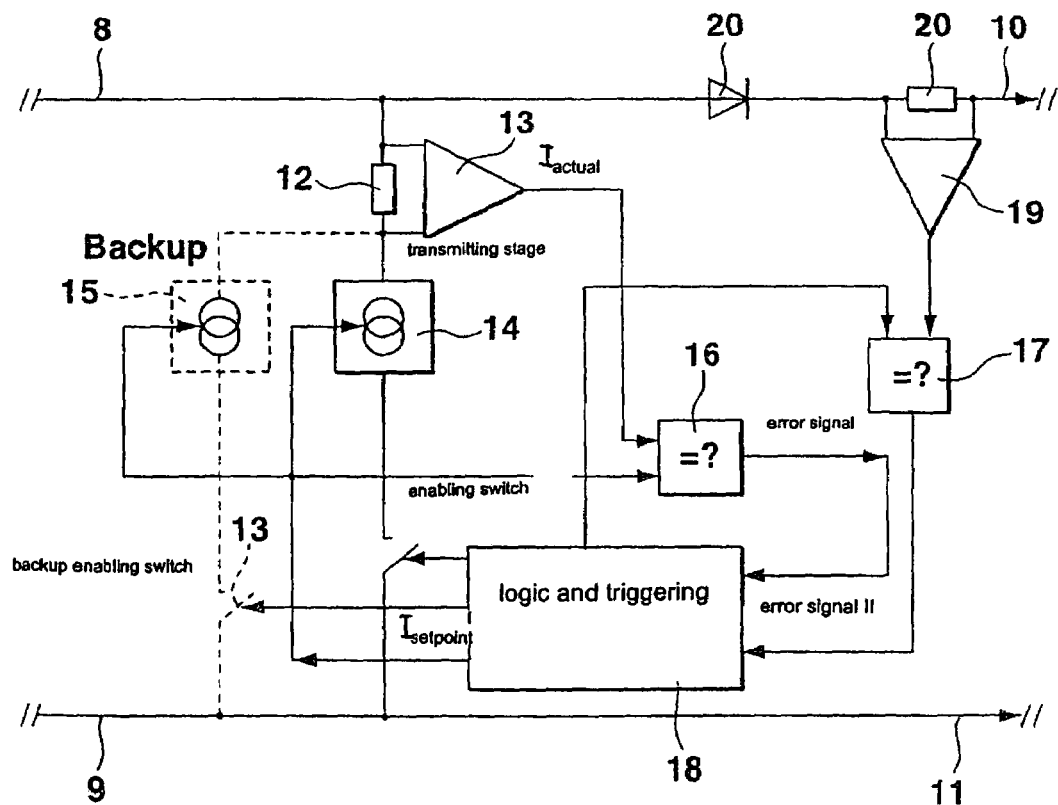
FIG. 2 shows a block diagram of the transmitting part of the bus station according to the present invention.

FIG. 2 shows a block diagram of the embodiment of a bus station according to the present invention. The bus station is connected to bus 3 via lines 8 and 9. Lines 8 and 9 are therefore used as means for receiving and transmitting data. In this case power line data transmission also takes place, i.e., modulation of the bus stations' power supply; therefore, lines 8 and 9 are also used for power supply. Line 8 is used in this case as high side and line 9 as low side or ground.

A first input of an operational amplifier 13, a shunt resistor 12, and an anode of a diode 20 are connected to line 8. The other end of shunt resistor 12 is connected to a second input of operational amplifier 13 and a transmitting stage 14, as well as to a backup transmitting stage 15. Transmitting stage 14 and backup transmitting stage 15 are controllable power sources, for which transistor circuits known to those skilled in the art are used.

The cathode side of diode 20 is connected to a first input of an operational amplifier 19 and a shunt resistor 20. The other end of shunt resistor 20 is connected to a sensor element (not shown) via a terminal 10 and a second input of operational amplifier 19. Transmitting stage 14 has a control input for current control, to which a logic circuit 19 is connected via a line $I_{setpoint}$ via a first output. Line $I_{setpoint}$ is furthermore connected to a control input of backup transmitting stage 15 and a first input of a comparing means 16. Comparing means 16 is a comparator here. The other side of transmitting stage 14 is connected to an enabling switch S1. Enabling switch S1 is controlled by logic circuit 18 via a second output. The other side of enabling switch S1 is connected to line 9.

The other side of backup transmitting stage 15 is connected to an enabling switch B, which is controlled by logic circuit 18 via a third output. The other side of switch B is connected to line 9. Output $I_{actual}$ of operational amplifier 13 is connected to a second input of comparator 16. Currents $I_{setpoint}$ and $I_{actual}$ are thus compared by comparator 16. An output of comparator 16 is connected to a first input of logic circuit 18.

A fourth output of logic circuit 18 is connected to a first input of a comparator 17. An output of operational amplifier 19 is connected to the second input of comparator 17, whose output is connected to a second input of logic circuit 18. Line 9 is connected to a terminal 11, which is connected to the sensor element. The sensor element which is not shown here is therefore connected between terminals 10 and 11.

Transmitting stage 14 is enabled to transmit when enabling switch S1 of logic circuit 18 has been closed. However, logic circuit 18 monitors the current delivered by transmitting stage 14, i.e., $I_{actual}$, via shunt resistor 12 and operational amplifier 13. Monitoring is performed both for the amplitude and the variation of the signal over time. Because logic circuit 18 knows which signals, i.e., which bits, are being transmitted, the variation of the signals over time is known to the logic circuit.

Transmitting stage 14 therefore delivers transmitting current $I_{actual}$, which is compared in comparator 16 with predefined current $I_{setpoint}$. Current $I_{setpoint}$ is predefined by logic circuit 18. An error signal I is then output at the output of comparator 16 as a function of the comparison. Error signal I may display a yes/no decision, i.e., whether $I_{setpoint}$ is less than $I_{actual}$, or indicate an optionally weighted difference between $I_{setpoint}$ and $I_{actual}$. It is possible that instead of actual currents $I_{actual}$ and $I_{setpoint}$, quantities derived therefrom are compared in comparator 16. Error signal I also provides the error as a function of time.

Logic circuit 18 decides, as a function of this error signal I, whether enabling switch S1 is to be opened or closed. If the error signal is high, i.e., the difference between $I_{actual}$ and $I_{setpoint}$ is greater than a predefined threshold value, transmitting stage 14 is not operating properly and enabling switch S1 is opened, so that transmitting stage 14 is not able to transmit. In other words, the circuit is muted.

The bus station according to the present invention has in this case backup transmitting stage 15, which is connectable by logic circuit 18 as a replacement. For this purpose, enabling switch B is closed and transmitting current $I_{actual}$ is again monitored, so that comparator 16 delivers error signal I also for this purpose. If error signal I is OK, enabling switch B remains closed. However, if error signal I is high again, enabling switch B is also opened, so that the bus station according to the present invention is no longer able to transmit, because neither the transmitting current from transmitting stage 14 nor the transmitting current from backup transmitting stage 15 corresponds to the predefined value. Therefore, backup transmitting stage 15 is monitored by logic circuit 18 in the same way as transmitting stage 14.

The power consumption by the bus station, i.e., sensor or ignition means, is also monitored in this case by comparing, in comparator 17, the output signal of operational amplifier 19, which is characteristic of the power consumption, to a predefined signal of logic circuit 18. Error signal II is then generated as a function of this comparison. Error signal II shows whether the power consumption is too high or too low or within predefined parameters. If the power consumption exhibits a fault through error signal II, logic circuit 18 opens enabling switch S1 and enabling switch B, since it is now obvious that the sensor element consumes an erroneous amount of power and therefore probably is not operating properly. In this way, it is ensured that a defective bus station is not connected to bus 3, thus possibly transmitting erroneous data over bus 3.

The bus station is a sensor in this case; however, the bus station may also be an ignition means. Logic circuit 18 is used here for sequence control by switching switches S1 and B as a function of error signals I and II. Logic circuit 18 may also be designed as a processor.

The invention claimed is:

1. A bus station for connection to a bus system for at least one of a restraining device and a sensor, comprising:
   a transmitting stage for transmitting a signal over the bus system;
   a logic circuit for performing a sequence control; and
   at least one comparator connected to the logic circuit and to an output of the transmitting stage, the at least one comparator performing at least one comparison of at least one of the signal transmitted from the transmitting stage and a power consumption of the bus station with a particular setpoint value, wherein:
      the logic circuit triggers the transmitting stage as a function of the at least one comparison, and
      the logic circuit monitors an amplitude and a variation over time of the signal from the transmitting stage on the basis of the particular setpoint value.

2. The bus station as recited in claim 1, further comprising:
   a first switch, wherein:
      if at least one of the signal of the transmitting stage and the power consumption exceeds the particular setpoint value in the at least one comparator, the logic circuit isolates the transmitting stage from the bus system via the first switch.

3. The bus station as recited in claim 2, further comprising:
   a second switch, wherein:
      if the transmitting stage is isolated, the logic circuit connects a backup transmitting stage to the bus system via the second switch.

4. The bus station as recited in claim 1, wherein:
   the bus station receives power via the bus system, and the transmitting stage modulates the power for transmitting.

* * * * *